United States Patent
Dunn

(10) Patent No.: US 11,511,610 B2
(45) Date of Patent: Nov. 29, 2022

(54) VEHICLE DOOR CARRIER WITH INTEGRATED EDGE SEAL AND METHOD OF MANUFACTURE

(71) Applicant: Shape Corp., Grand Haven, MI (US)

(72) Inventor: Paul Dunn, Holland, MI (US)

(73) Assignee: Shape Corp., Grand Haven, MI (US)

(*) Notice: Subject to any disclaimer, the term of this patent is extended or adjusted under 35 U.S.C. 154(b) by 135 days.

(21) Appl. No.: 16/681,364

(22) Filed: Nov. 12, 2019

(65) Prior Publication Data

US 2020/0148048 A1 May 14, 2020

Related U.S. Application Data

(60) Provisional application No. 62/758,838, filed on Nov. 12, 2018.

(51) Int. Cl.
| | |
|---|---|
| *B60J 10/86* | (2016.01) |
| *B60J 10/00* | (2016.01) |
| *B60J 10/16* | (2016.01) |

(52) U.S. Cl.
CPC .............. *B60J 10/86* (2016.02); *B60J 10/16* (2016.02); *B60J 10/45* (2016.02)

(58) Field of Classification Search
CPC . B60J 10/86; B60J 10/16; B60J 5/0484; B60J 5/0416
See application file for complete search history.

(56) References Cited

U.S. PATENT DOCUMENTS

| | | | |
|---|---|---|---|
| 2,579,072 A | 12/1951 | Harris | |
| 2,719,331 A | 10/1955 | Harris | |
| 4,813,690 A | 3/1989 | Coburn, Jr. | |
| 5,048,234 A * | 9/1991 | Lau | B60J 5/0416 49/502 |
| 5,251,954 A | 10/1993 | Vande Kopple et al. | |
| 5,524,907 A | 6/1996 | Walser | |
| 5,557,078 A | 9/1996 | Holwerda | |
| 5,613,327 A | 3/1997 | Sauve | |
| 5,868,458 A | 2/1999 | Hirata et al. | |
| 5,873,623 A | 2/1999 | Dunton et al. | |
| 5,904,002 A | 5/1999 | Emerling et al. | |
| 6,056,526 A | 5/2000 | Sato | |
| 6,079,732 A | 6/2000 | Nakajima et al. | |
| 6,095,591 A | 8/2000 | Matsuyama et al. | |
| 6,139,088 A * | 10/2000 | Okamoto | B60J 5/0416 296/146.1 |
| 6,328,315 B1 | 12/2001 | Hebenstreit | |
| 6,333,515 B1 | 12/2001 | Kubota et al. | |
| 6,367,202 B1 | 4/2002 | Reed et al. | |
| 6,367,865 B1 | 4/2002 | Royse | |

(Continued)

FOREIGN PATENT DOCUMENTS

| | | |
|---|---|---|
| AT | 4284 U1 | 5/2001 |
| BE | 1023981 B1 | 9/2017 |

(Continued)

*Primary Examiner* — Gregory J Strimbu
(74) *Attorney, Agent, or Firm* — Bodman PLC

(57) ABSTRACT

A door carrier includes a body formed of a first material, the body including an edge extending around a perimeter of the body. The door carrier includes a seal having a proximal end affixed to the edge and a distal end spaced from the proximal end, the seal being formed of a second material more resilient than the first material.

21 Claims, 14 Drawing Sheets

(56) References Cited

U.S. PATENT DOCUMENTS

| | | |
|---|---|---|
| 6,422,640 B2 | 7/2002 | Whitehead et al. |
| 6,499,797 B1 | 12/2002 | Bohm et al. |
| 6,546,674 B1 | 4/2003 | Emerling et al. |
| 6,565,117 B2 | 5/2003 | Kubota et al. |
| 6,634,698 B2 | 10/2003 | Kleino |
| 6,676,195 B1 | 1/2004 | Marriott et al. |
| 6,823,628 B2 * | 11/2004 | Morrison ............... B60J 5/0416 49/348 |
| 6,955,392 B2 | 10/2005 | Dry |
| 7,055,887 B2 | 6/2006 | Williams, II et al. |
| 7,108,313 B2 | 9/2006 | Forrester et al. |
| 7,131,685 B2 | 11/2006 | Carrier |
| 7,364,218 B2 * | 4/2008 | Radu ............... B29C 45/1676 296/146.7 |
| 7,478,781 B2 | 1/2009 | Granzeier et al. |
| 7,494,179 B2 | 2/2009 | Deachin et al. |
| 7,971,923 B2 | 7/2011 | Mazur et al. |
| 8,065,836 B2 | 11/2011 | Koellner et al. |
| 8,597,763 B2 | 12/2013 | Lehmann et al. |
| 9,010,843 B2 | 4/2015 | Lewis et al. |
| 9,168,879 B2 | 10/2015 | Timmermann et al. |
| 9,522,636 B2 | 12/2016 | Brandt et al. |
| 9,592,720 B2 | 3/2017 | Moebius |
| 9,637,067 B2 | 5/2017 | Kohlstrung et al. |
| 10,279,754 B2 | 5/2019 | Kulkarni et al. |
| 10,336,265 B2 | 7/2019 | Dickinson et al. |
| 2002/0171260 A1 | 11/2002 | Schneider |
| 2005/0012280 A1 | 1/2005 | Richardson |
| 2005/0248181 A1 | 11/2005 | Bigelow |
| 2005/0269840 A1 | 12/2005 | Finerman et al. |
| 2006/0066127 A1 | 3/2006 | Shibuya et al. |
| 2006/0261633 A1 | 11/2006 | Winborn |
| 2006/0261635 A1 | 11/2006 | Winborn et al. |
| 2007/0046064 A1 | 3/2007 | Winborn |
| 2007/0101679 A1 | 5/2007 | Harthcock et al. |
| 2007/0220811 A1 | 9/2007 | Flendrig et al. |
| 2008/0201920 A1 | 8/2008 | Jatzke |
| 2008/0203754 A1 | 8/2008 | Towne et al. |
| 2008/0258495 A1 | 10/2008 | Fuetterer |
| 2009/0015029 A1 | 1/2009 | Nabert et al. |
| 2009/0021053 A1 | 1/2009 | Harberts et al. |
| 2010/0107506 A1 | 5/2010 | Wirthwein et al. |
| 2014/0212621 A1 | 7/2014 | Blottiau |
| 2014/0259952 A1 | 9/2014 | Sheehy et al. |
| 2015/0123310 A1 | 5/2015 | Leonard |
| 2015/0367716 A1 | 12/2015 | Baxter et al. |
| 2016/0129781 A1 | 5/2016 | Eckstein |
| 2016/0303959 A1 | 10/2016 | Mori et al. |
| 2017/0100996 A1 | 4/2017 | Husek et al. |
| 2017/0136965 A1 | 5/2017 | Schulte et al. |
| 2017/0349118 A1 | 12/2017 | Gonnet |
| 2018/0244215 A1 | 8/2018 | Husek et al. |
| 2018/0354349 A1 | 12/2018 | Fortin et al. |
| 2019/0160716 A1 | 5/2019 | Thomson et al. |
| 2019/0308567 A1 | 10/2019 | Husek et al. |

FOREIGN PATENT DOCUMENTS

| | | |
|---|---|---|
| BR | 102018074656 A2 | 6/2019 |
| CA | 2256735 A1 | 12/1997 |
| CA | 2254840 C | 11/2006 |
| CA | 2364457 C | 5/2008 |
| CA | 2649227 C | 4/2013 |
| CN | 1290217 A | 4/2001 |
| CN | 1296450 A | 5/2001 |
| CN | 1723140 A | 1/2006 |
| CN | 1774466 A | 5/2006 |
| CN | 1912330 A | 2/2007 |
| CN | 101374904 A | 2/2009 |
| CN | 102039855 B | 6/2013 |
| CN | 104627089 A | 5/2015 |
| CN | 105313799 A | 2/2016 |
| CN | 105602121 A | 5/2016 |
| CN | 106499272 A | 3/2017 |
| CN | 106541807 A | 3/2017 |
| CN | 107128256 A | 9/2017 |
| CN | 107278216 A | 10/2017 |
| CN | 107444082 A | 12/2017 |
| CN | 107757520 A | 3/2018 |
| CN | 108346906 A | 7/2018 |
| CN | 108515926 A | 9/2018 |
| CN | 108528355 A | 9/2018 |
| CN | 108819867 A | 11/2018 |
| CN | 108819868 A | 11/2018 |
| CN | 108944724 A | 12/2018 |
| DE | 19650531 A1 | 6/1997 |
| DE | 19620148 A1 | 11/1997 |
| DE | 19749547 A1 | 5/1998 |
| DE | 19724802 A1 | 12/1998 |
| DE | 19804781 A1 | 8/1999 |
| DE | 19816012 A1 | 10/1999 |
| DE | 19951682 A1 | 5/2000 |
| DE | 10014928 A1 | 12/2000 |
| DE | 10033243 A1 | 3/2001 |
| DE | 19944965 A1 | 3/2001 |
| DE | 10036402 A1 | 2/2002 |
| DE | 10158230 A1 | 6/2003 |
| DE | 10247678 A1 | 4/2004 |
| DE | 10326295 A1 | 1/2005 |
| DE | 102004055566 A1 | 2/2006 |
| DE | 102004055567 A1 | 2/2006 |
| DE | 102005009183 A1 | 2/2006 |
| DE | 202004015625 U1 | 2/2006 |
| DE | 102005040061 A1 | 3/2006 |
| DE | 202005001782 U1 | 6/2006 |
| DE | 102004050529 B3 | 8/2006 |
| DE | 102005009179 A1 | 9/2006 |
| DE | 102005011075 A1 | 9/2006 |
| DE | 60303184 T2 | 11/2006 |
| DE | 202005013298 U1 | 12/2006 |
| DE | 202005014602 U1 | 2/2007 |
| DE | 102005042123 A1 | 3/2007 |
| DE | 102005044114 A1 | 3/2007 |
| DE | 102005012264 B4 | 4/2007 |
| DE | 202007001999 U1 | 4/2007 |
| DE | 202006019919 U1 | 5/2007 |
| DE | 102005047955 B3 | 6/2007 |
| DE | 102005057991 A1 | 6/2007 |
| DE | 102005059458 A1 | 6/2007 |
| DE | 102006002815 A1 | 7/2007 |
| DE | 102006030522 B3 | 8/2007 |
| DE | 202006007387 U1 | 9/2007 |
| DE | 102006047830 A1 | 4/2008 |
| DE | 102006049679 A1 | 4/2008 |
| DE | 102007020585 A1 | 5/2008 |
| DE | 102007018667 A1 | 10/2008 |
| DE | 202007007884 U1 | 10/2008 |
| DE | 102007026544 A1 | 12/2008 |
| DE | 102007031446 B3 | 12/2008 |
| DE | 202007011529 U1 | 12/2008 |
| DE | 102009004930 A1 | 7/2010 |
| DE | 102009010440 A1 | 9/2010 |
| DE | 102009026069 A1 | 12/2010 |
| DE | 102010051240 A1 | 6/2011 |
| DE | 202012000931 U1 | 5/2013 |
| DE | 102012008032 A1 | 10/2013 |
| DE | 102013010598 A1 | 12/2014 |
| DE | 102007063615 B4 | 5/2015 |
| DE | 202015101955 U1 | 5/2015 |
| DE | 102015205667 B3 | 6/2016 |
| DE | 102017116069 A1 | 1/2018 |
| DE | 102017004456 A1 | 3/2018 |
| DE | 102016012179 A1 | 4/2018 |
| DE | 102017201033 A1 | 7/2018 |
| DE | 102013200489 B4 | 8/2018 |
| DE | 102018115622 A1 | 8/2018 |
| DE | 102017211291 A1 | 1/2019 |
| DE | 102018209240 A1 | 3/2019 |
| EP | 0151119 A1 | 8/1985 |
| EP | 0721862 A1 | 7/1996 |
| EP | 0797501 B1 | 8/2000 |
| EP | 1179451 A1 | 2/2002 |
| EP | 1293387 B1 | 8/2006 |

(56) References Cited

FOREIGN PATENT DOCUMENTS

| | | |
|---|---|---|
| EP | 1446596 B1 | 2/2007 |
| EP | 1923252 A2 | 5/2008 |
| EP | 2000365 A1 | 12/2008 |
| EP | 1839953 B1 | 6/2010 |
| EP | 2300270 A2 | 3/2011 |
| EP | 2159108 B1 | 6/2011 |
| EP | 2531686 A1 | 12/2012 |
| EP | 2681080 A1 | 1/2014 |
| EP | 2694332 A1 | 2/2014 |
| EP | 2823999 A2 | 1/2015 |
| EP | 2714444 B1 | 5/2016 |
| EP | 3078519 A1 | 10/2016 |
| EP | 1759927 B1 | 8/2017 |
| EP | 3421299 A1 | 1/2019 |
| EP | 3521075 A1 | 8/2019 |
| ES | 2242700 T3 | 11/2005 |
| ES | 2336613 T3 | 4/2010 |
| ES | 2390599 T3 | 11/2012 |
| ES | 2420109 T3 | 8/2013 |
| FR | 2648419 A1 | 12/1990 |
| FR | 2729448 A1 | 7/1996 |
| FR | 2766428 A1 | 1/1999 |
| FR | 2785244 A1 | 5/2000 |
| FR | 2792700 A1 | 10/2000 |
| FR | 2812847 A1 | 2/2002 |
| FR | 2832482 A1 | 5/2003 |
| FR | 2846612 A1 | 5/2004 |
| FR | 2892679 A1 | 5/2007 |
| FR | 2915154 A1 | 10/2008 |
| FR | 2916707 A1 | 12/2008 |
| FR | 2920114 A1 | 2/2009 |
| FR | 2923193 A1 | 5/2009 |
| FR | 3055113 A1 | 2/2018 |
| FR | 3065415 A1 | 10/2018 |
| GB | 2314049 A | 12/1997 |
| GB | 2318551 A | 4/1998 |
| GB | 2355438 A | 4/2001 |
| GB | 2357471 A | 6/2001 |
| GB | 2399129 A | 9/2004 |
| GB | 2424614 A | 10/2006 |
| GB | 2510017 A | 7/2014 |
| GB | 2518177 A | 3/2015 |
| GB | 2560102 A | 8/2018 |
| JP | H08119047 A | 5/1996 |
| JP | H09109842 A | 4/1997 |
| JP | H10181512 A | 7/1998 |
| JP | H1148781 A | 2/1999 |
| JP | 3052766 B2 | 6/2000 |
| JP | 2001146139 A | 5/2001 |
| JP | 2005532956 A | 11/2005 |
| JP | 3878182 B2 | 2/2007 |
| JP | 2008514793 A | 5/2008 |
| JP | 2010001002 A | 1/2010 |
| JP | 4976935 B2 | 7/2012 |
| JP | 5044408 B2 | 10/2012 |
| JP | 5626310 B2 | 11/2014 |
| JP | 2016530373 A | 9/2016 |
| JP | 2016536171 A | 11/2016 |
| JP | 2017077850 A | 4/2017 |
| JP | 2017132397 A | 8/2017 |
| JP | 6527245 B2 | 6/2019 |
| KR | 0145719 B1 | 10/1989 |
| KR | 20010057991 A | 7/2001 |
| KR | 20010060897 A | 7/2001 |
| KR | 20020021821 A | 3/2002 |
| KR | 20040025917 A | 3/2004 |
| KR | 20050021575 A | 3/2005 |
| KR | 20050027706 A | 3/2005 |
| KR | 20050120939 A | 12/2005 |
| KR | 20060035440 A | 4/2006 |
| KR | 20070034738 A | 3/2007 |
| KR | 20070062782 A | 6/2007 |
| KR | 100762938 B1 | 10/2007 |
| KR | 100776653 B1 | 11/2007 |
| KR | 100795697 B1 | 1/2008 |
| KR | 100826680 B1 | 4/2008 |
| KR | 20080044111 A | 5/2008 |
| KR | 100847000 B1 | 7/2008 |
| KR | 100866695 B1 | 11/2008 |
| KR | 20090007178 A | 1/2009 |
| KR | 20090008091 A | 1/2009 |
| KR | 20090008092 A | 1/2009 |
| KR | 20090008743 A | 1/2009 |
| KR | 20090008834 A | 1/2009 |
| KR | 20090126540 A | 12/2009 |
| KR | 20100029799 A | 3/2010 |
| KR | 20100040437 A | 4/2010 |
| KR | 20100048252 A | 5/2010 |
| KR | 20100079988 A | 7/2010 |
| KR | 20110001966 A | 1/2011 |
| KR | 20110023204 A | 3/2011 |
| KR | 20110032361 A | 3/2011 |
| KR | 20110110711 A | 10/2011 |
| KR | 20110119769 A | 11/2011 |
| KR | 20110139997 A | 12/2011 |
| KR | 20120001312 A | 1/2012 |
| KR | 101619397 B1 | 5/2016 |
| KR | 101628949 B1 | 6/2016 |
| KR | 20170047887 A | 5/2017 |
| KR | 20180119942 A | 11/2018 |
| KR | 20180119943 A | 11/2018 |
| KR | 101927389 B1 | 12/2018 |
| KR | 20190046395 A | 5/2019 |
| SK | 139195 A3 | 5/1996 |
| WO | WO-1984003659 A1 | 9/1984 |
| WO | WO-1996016793 A1 | 6/1996 |
| WO | WO-200003175 A1 | 1/2000 |
| WO | WO-2000021768 A1 | 4/2000 |
| WO | WO-200154949 A1 | 8/2001 |
| WO | WO-2006027936 A1 | 3/2006 |
| WO | WO-2006092502 A1 | 9/2006 |
| WO | WO-2006127643 A2 | 11/2006 |
| WO | WO-2008113317 A2 | 9/2008 |
| WO | WO-2009156077 A2 | 12/2009 |
| WO | WO-2010003549 A2 | 1/2010 |
| WO | WO-2013099699 A1 | 7/2013 |
| WO | WO-2014005904 A1 | 1/2014 |
| WO | WO-2014050642 A1 | 4/2014 |
| WO | WO-2017033580 A1 | 2/2018 |

\* cited by examiner

VEHICLE DOOR CARRIER WITH INTEGRATED EDGE SEAL AND METHOD OF MANUFACTURE

CROSS REFERENCE TO RELATED APPLICATIONS

This non-provisional U.S. patent application claims priority under 35 U.S.C. § 119(e) to U.S. Provisional Patent Application Ser. No. 62/758,838, filed Nov. 12, 2018, the disclosure of which is hereby incorporated by reference in its entirety.

TECHNICAL FIELD

The present disclosure generally relates to door carriers and associated forming methods, and more particularly to seals of door carriers for vehicles.

BACKGROUND

Vehicles, such as automobiles, include a plurality of door assemblies to allow entrance into and departure from the vehicle. The door assemblies may include a door frame and a door carrier disposed within the door frame, where a perimeter of the door carrier may be substantially surrounded by the door frame. To protect internal components of the door from environmental factors (e.g., water, debris, and dust), a seal may be provided around the perimeter of the door carrier. The seal may be formed of a resilient material such that the seal absorbs vibrations between the door frame and the door carrier during operation of the vehicle and so as to allow for manufacturing tolerances of the door frame.

SUMMARY

The present disclosure provides a door carrier and a method for manufacturing the door carrier. The door carrier includes a body formed of a first material, where the body has an edge that extends around a perimeter of the body. The door carrier also includes a seal formed of a second material, where the seal is affixed to the edge of the body, such as via a chemical bonding of the seal when it is formed or injection molded at the edge of the body. The seal may extend away from the edge of the body, so as to space a distal end of the seal away from a proximal end that is affixed to the edge. The second material that forms the seal may be more resilient than the first material, such as, for example, a thermoplastic elastomer of the seal that has a lower durometer than a polypropylene used to form the body of the door carrier.

The edge of the body may extend continuously around the perimeter of the body of the door carrier, such that the seal may be affixed continuously to the edge around the perimeter of the body. The edge of the body may generally extend between and interconnect opposing first and second surfaces of the body. However, the body of the door carrier may include a portion that protrudes over the edge, such as a window rail that is integrated with the body of the door carrier. The protruding portion of the body may include a first surface of the body and an opposite side of the body may include a second surface. As such, at least a portion of the edge may be disposed between the first surface and the second surface, such as where the first surface of the protruding portion extends beyond the edge that receives the seal.

The seal may have a bend so as to define first portion extending along a first direction from the proximal end to the bend and a second portion extending along a second direction from the bend to the distal end at an angle relative to the first direction. The seal may have a length from the proximal end to the distal end, such as, for example, a length approximately between 5 mm and 15 mm. The seal may also have a thickness approximately between 0.5 mm and 2 mm.

The method for manufacturing the door carrier includes providing a tool or injection molding assembly that has a cover that encloses a portion of a cavity that forms the door carrier. A first tool or mold piece is provided at a spacing from and opposite the cover to at least partially define the cavity. A core back is slidably attached to the first tool to allow the core back to slide or move along a first direction between a retracted position and an engaged position that separates or restricts access to a portion of the cavity. To form a portion that protrudes over an edge of the body, another mold piece or lifter may be provided between the cover and the first tool. The method includes filling a first cavity with a first material to form a first piece. The method includes moving the core back along the first direction away from the lifter to expose a second adjacent cavity. The method includes filling the second cavity with a second material more resilient than the first material to form a second piece in contact with and bonded to the exposed edge of the first piece. The method further includes moving the first tool and the core back together along the first direction away from the cover, so as to permit the lifter to move along a second direction generally perpendicular to the first direction away from the first piece.

The step of moving the lifter along the second direction may include sliding the lifter against the second piece. Prior to moving the lifter along the second direction, the second piece may be in a first position. While moving the lifter along the second direction, the second piece may flex away from the lifter along the first direction to a second position. After moving the lifter along the second direction, the second piece may flex and substantially return to the first position. The material of the first piece may include a polypropylene and the second piece may include a thermoplastic elastomer (TPE) or similar material with thermoplastic or elastomeric properties.

These and other objects, advantages, purposes, and features of the present disclosure will become apparent upon review of the following specification in conjunction with the drawings.

DETAILED DESCRIPTION

Figure 1:
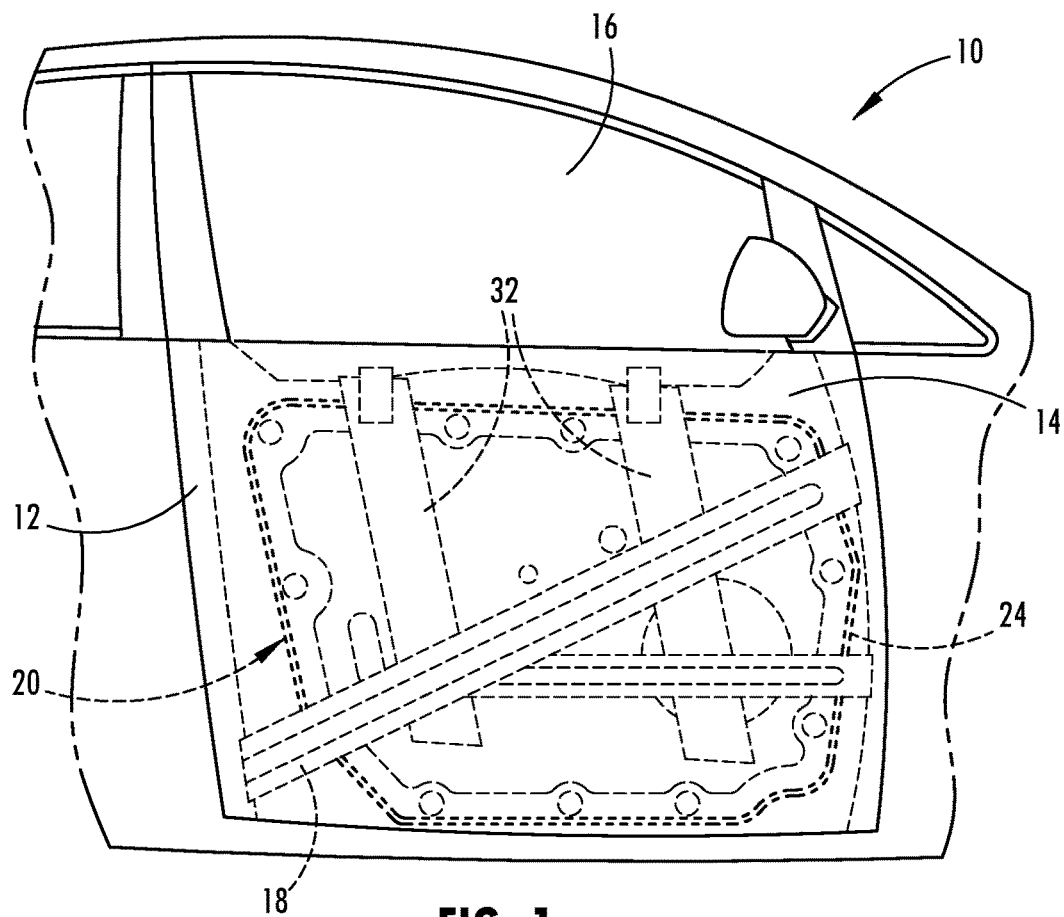
FIG. 1 is an exterior side elevational view of a vehicle door, showing a door beam and a door carrier according to one or more examples illustrated herein.

Referring now to the drawings and the illustrative embodiments depicted therein, a door carrier 20 is generally shown that has a body 22 and a seal 24. The seal 24 is disposed at an edge 30 of the body 22 and extends around a perimeter of the body 22. The seal 24 is affixed to the edge 30 of the body 22, such as via a chemical bonding of the seal 24 when it is formed or injection molded at the edge 30 of the body 22. The seal 24 may extend away from the edge 30 of the body 22, so as to space a distal end 36 of the seal 24 away from a proximal end 34 that is affixed to the edge 30. The body 22 is formed of a first material and the seal 24 is formed of a second material that is substantially more resilient or with a lower durometer than the first material.

The perimeter of the door carrier 20 may be secured against or otherwise disposed at a frame component of a vehicle door, so as to place the seal 24 in contact with a perimeter portion of the frame component. It is contemplated that the door carrier may alternatively be disposed at a frame component of other portions of a vehicle frame. The frame component that receives the door carrier 20 may be partially exposed to an outside environment, including environmental factors such as water, debris, dust, mud, etc. The door carrier 20 may include a plurality of internal components. The seal 24 may provide the internal components with protection from environmental factors. Additionally, the seal 24 may provide a cushioning effect and may partially absorb vibrations between the frame component and the door carrier 20 while the vehicle is operated. Further, the seal 24 may absorb variations between the frame component and the door carrier 20.

Figure 2:
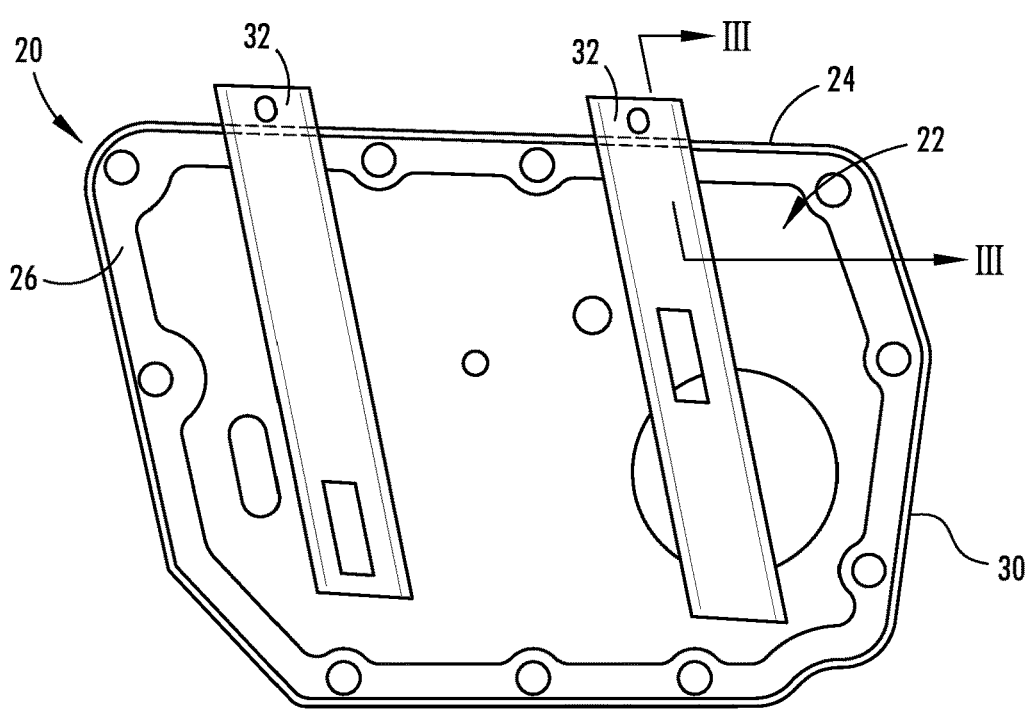
FIG. 2 is a side elevational view of the door carrier shown in FIG. 1.
Figure 3:
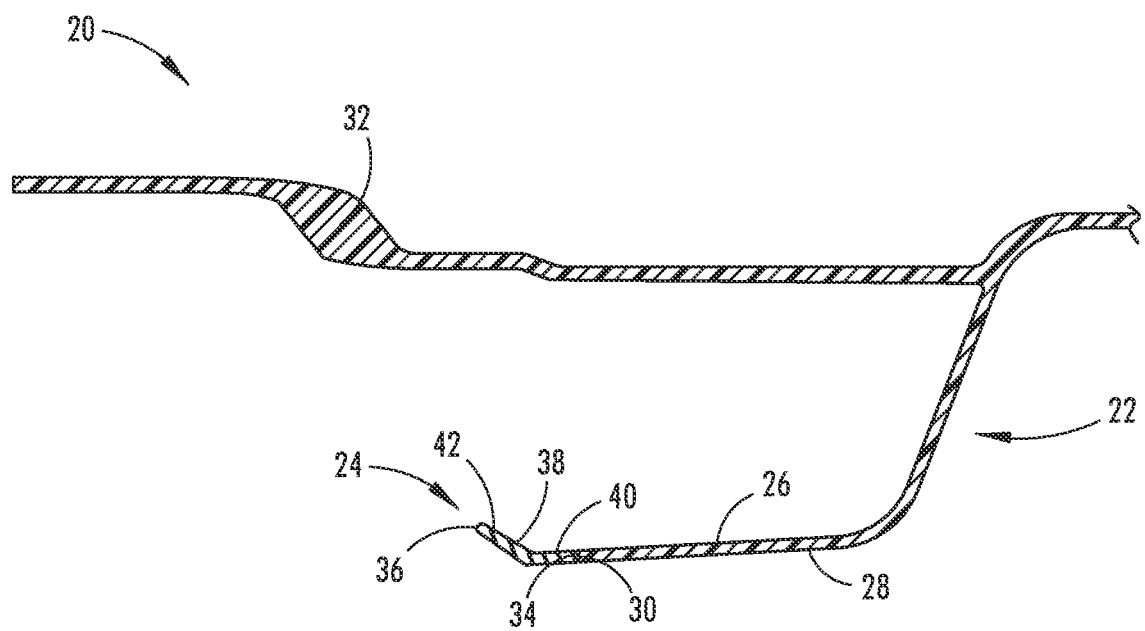
FIG. 3 is a cross-sectional view of an edge portion of a door carrier including a seal.

With reference to FIGS. 1-3, the door carrier 20 is generally shown. A vehicle 10 is shown that has a door assembly 12 that includes a door frame 14 and the door carrier 20 disposed within the door frame 14. The door frame 14 has an interior-facing surface that surrounds a cavity of the door frame 14, such that the seal 24 of the door carrier 20 mates against and consistently along the interior-facing surface of the door frame 14 to cover and seal the cavity of the door assembly 12, such as to protect internal components (e.g., door handles, electrical switches and components, window regulators, etc.), A door window 16 may engage with window rails 32 integrally formed on the door carrier 20, such as to provide operability to the door window 16 by allowing it to slide up and down within the door frame 14. The door frame 14 may also include other structural components, such as impact beams 18 and the like.

In a vehicle, there may be any suitable number of door carriers 20, such as, for example, two door carriers 20, four door carriers 20, etc. Each door of the vehicle may include a single door carrier, although it is contemplated that, alternatively, a single door may have a frame component that utilizes multiple door carriers. The body 22 of the door carrier 20 may include a first surface 26 and a second surface 28 opposite the first surface 26. In a fully-assembled vehicle, the first surface 26 may generally face an interior cabin of the vehicle and the second surface 28 may generally face an exterior environment. The first surface 26 and the second surface 28 may include a plurality of apertures, protrusions, depressions, or other formations to house or secure a plurality of internal components for a vehicle.

The body 22 of the door carrier 20 may include a portion or feature that protrudes over the edge 30, such as a window rail 32 that is at least partially integrated with the body 22. The protruding portion of the body 22 may include the first surface 26 of the body 22, such that at least a portion of the edge 30 may be disposed between the first surface 26 and the second surface 28, such as where the first surface 26 of the rail 32 extends beyond the edge 30. As one example, the rails 32 may be formed integrally with the body 22 using the same material. As another example, the rails or portions thereof may be formed separately from the door carrier and may be affixed or disposed adjacent to the body. The rails 32 may house window components, such as, for example, window regulators, motors, windows, etc.

The edge 30 of the body 22 may be disposed between the first surface 26 and the second surface 28. For example, the edge 30 may generally interconnect and extend from the first surface 26 to the second surface 28. The edge 30 may have a thickness approximately between 0.5 mm and 3 mm, such as to generally approximate the thickness of the body 22 or portion of the body 22 near the edge 30. It is also contemplated that the thickness of the edge may alternatively be more or less than this range, such as a thickness capable of providing a surface area sufficient to adhere to the seal 24. The edge 30 may extend continuously around the perimeter of the body 22. That is, the edge 30 may completely surround the body 22 in a generally planar configuration.

The body 22 may be formed of a first material, such as via injection molding in a single shot. The first material may be any suitable material, such as, for example, polypropylene, polyvinyl chloride, polyethylene, etc. As another example, the first material may be any suitable combination of the foregoing materials and may alternatively be formed with multiple injection shots of material.

Figure 4:
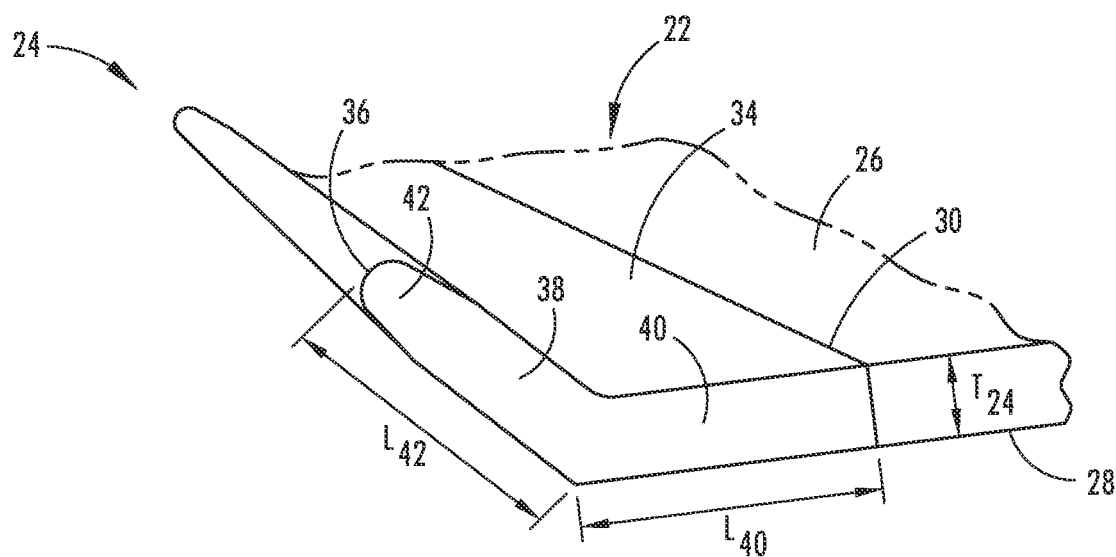
FIG. 4 is a perspective view of a portion of the seal shown in FIG. 3.
Figure 5:
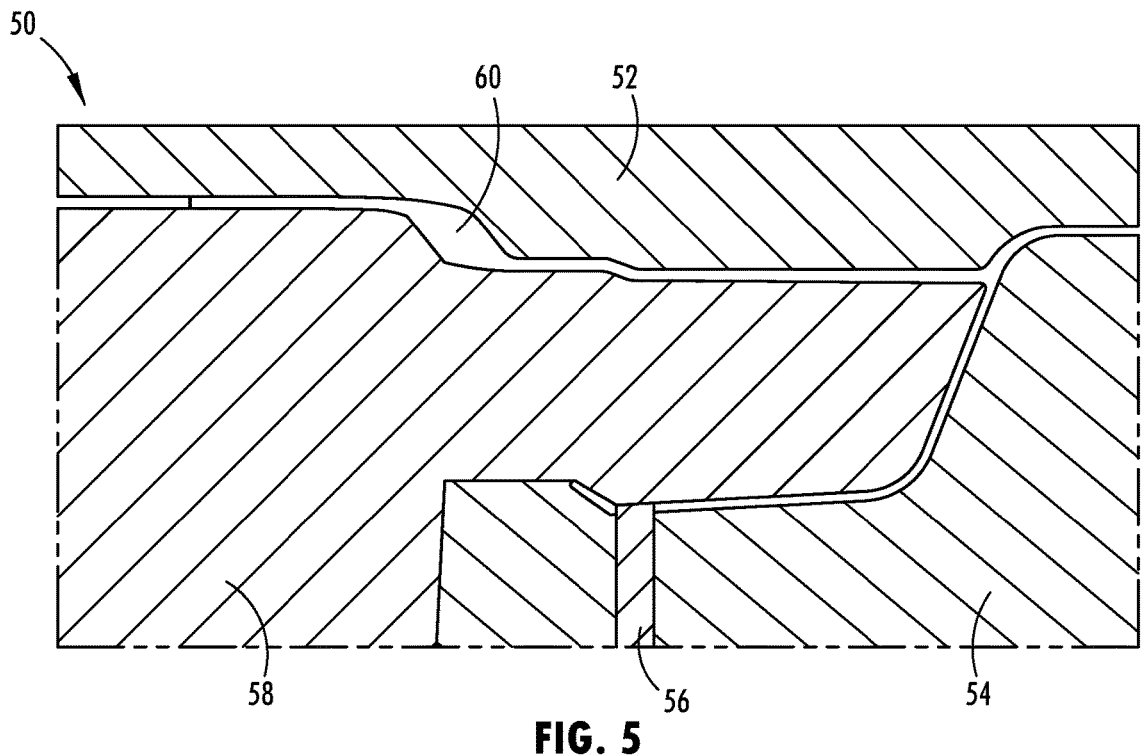
FIG. 5 is a schematic cross-sectional view of an injection molding assembly.
Figure 6:
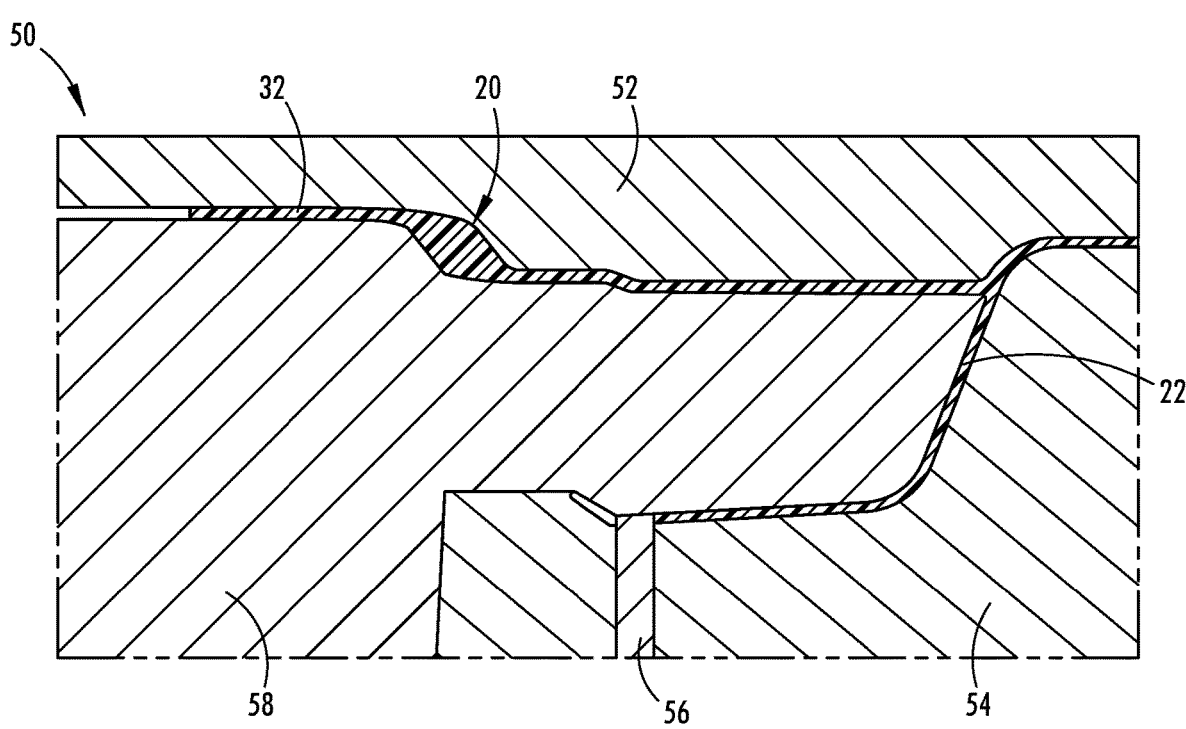
FIG. 6 is a schematic cross-sectional view of a first shot injection stage of the injection molding assembly of FIG. 5.
Figure 7:
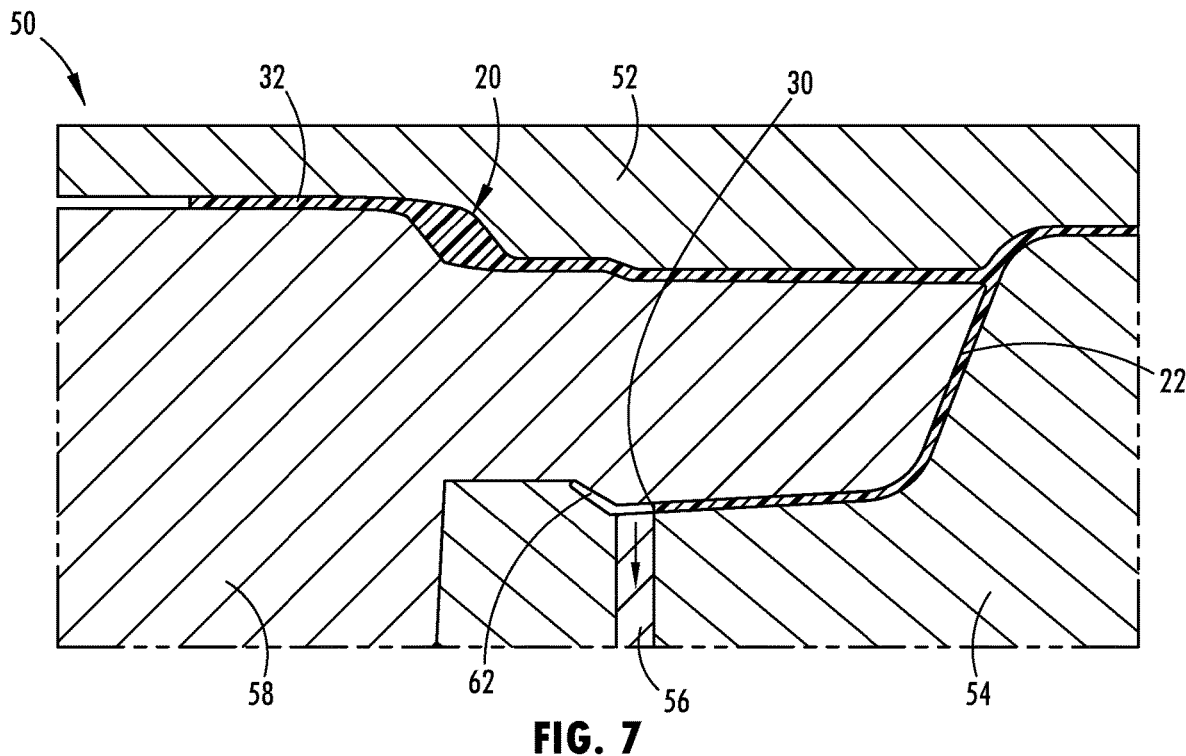
FIG. 7 is a schematic cross-sectional view of a core back removal stage of the injection molding assembly of FIG. 5.
Figure 8:
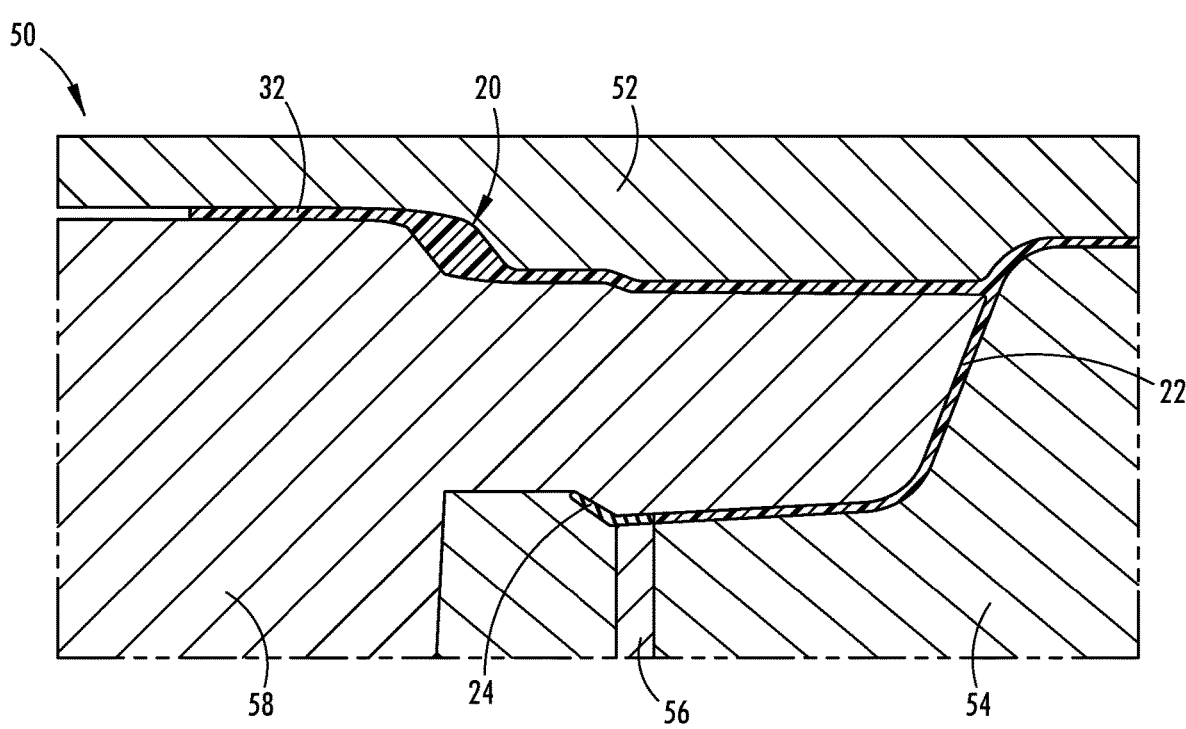
FIG. 8 is a schematic cross-sectional view of a second shot injection stage of the injection molding assembly of FIG. 5.
Figure 9:
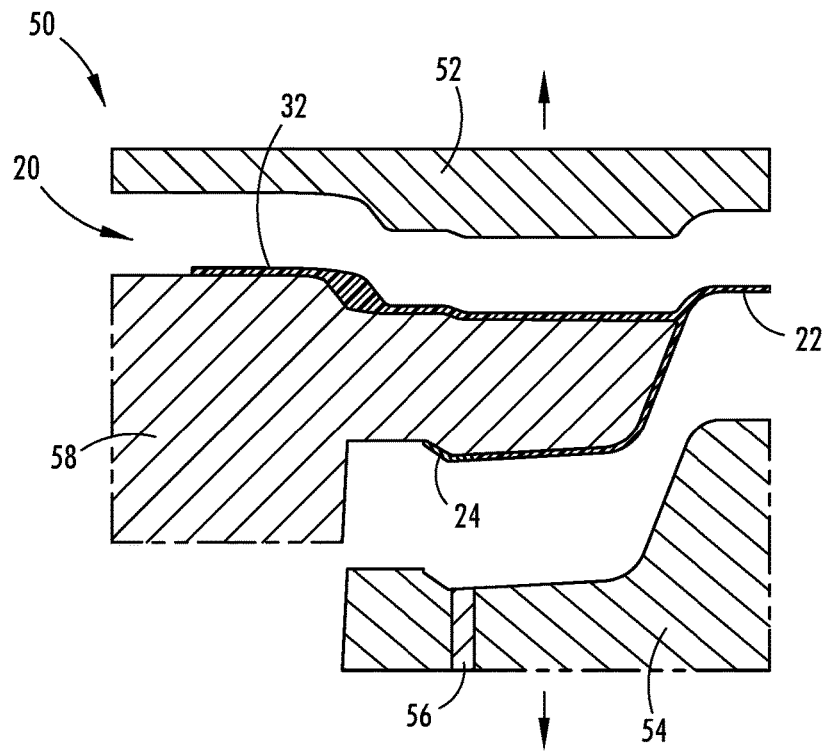
FIG. 9 is an initial stage release of upper and lower die pieces of the injection molding assembly.
Figure 10:
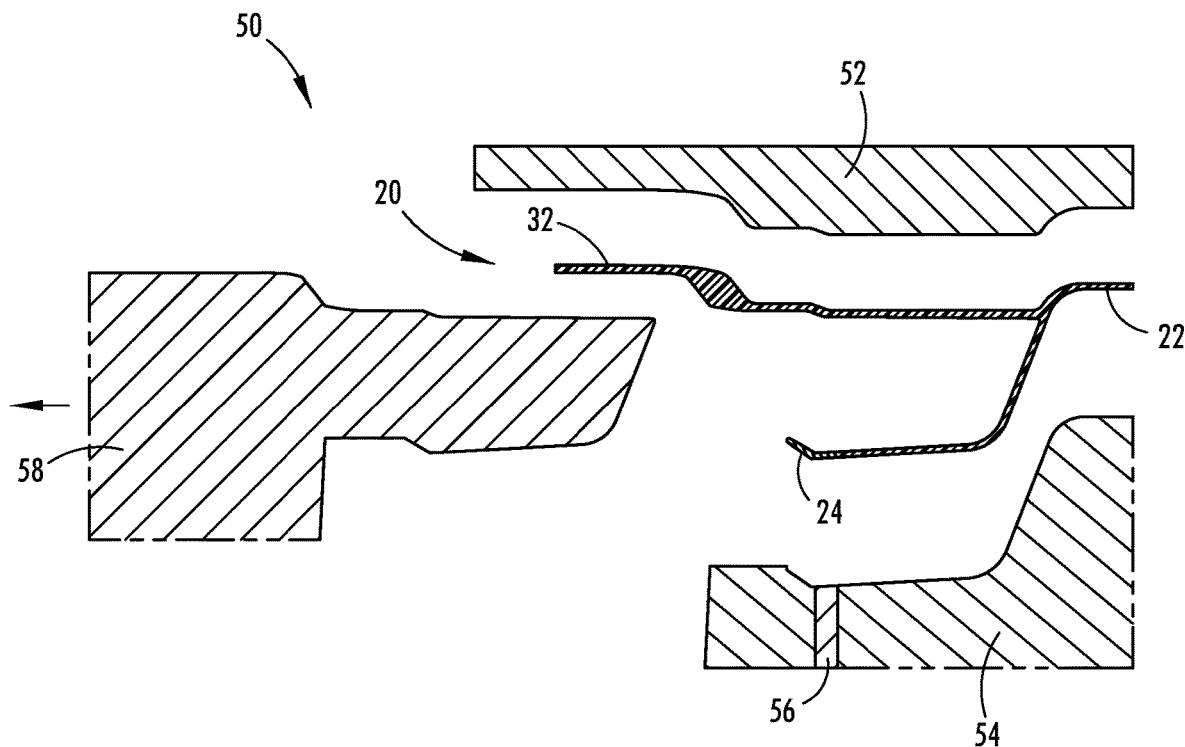
FIG. 10 is an secondary stage release of a lifter of the injection molding assembly.

With reference to FIGS. 3-4, the seal 24 is affixed to the edge 30. The seal 24, i.e., the proximal end 34, may be affixed to the edge 30 in any suitable manner, such as, for example, chemical bonding, adhesive, mechanical fasteners, overmolding, etc. The seal 24 may be affixed to the edge 30 continuously around the perimeter of the body 22. That is, the seal 24 may completely surround the body 22 in a generally planar configuration.

The seal 24 may include a bend 38 disposed between the proximal end 34 and the distal end 36. The seal 24 may include a first portion 40 extending from the proximal end 34 to the bend 38 along a first direction and a second portion 42 extending from the bend 38 to the distal end 36 along a second direction at an angle relative to the first direction. The angle between the first direction and the second direction may be approximately between 0 and 90 degrees. For example, the angle between the first direction and the second direction may be approximately between 30 and 60 degrees.

The first portion 40 may have a length $L_{40}$ from the proximal end 34 to the bend 38. The second portion 42 may have a length $L_{42}$ from the bend 38 to the distal end 36. The seal 24 may have a length $L_{24}$ from the proximal end 34 to the distal end 36, i.e., the length $L_{24}$ of the seal 24 may equal to the length $L_{40}$ of the first portion plus the length $L_{42}$ of the second portion 42. For example, the length $L_{24}$ of the seal 24 may be approximately between 5 mm and 15 mm. Additionally, the seal 24 may have a thickness $T_{24}$ generally equal to the thickness of the edge 30. For example, the thickness $T_{24}$ of the seal 24 may be approximately between 0.5 mm and 2 mm or, alternatively, between 0.5 mm and 3 mm, or another alternative thickness dimension that is desired for the particular dimensions of the corresponding door carrier and associated vehicle application. Accordingly, the thickness $T_{24}$ of the seal 24 may be adjusted for the corresponding durometer of the seal 24 material, such as a larger thickness of the seal 24 for a lower durometer and a thinner seal 24 for a higher durometer.

The seal 24 may be formed of the second material. The second material may be any suitable material, such as, for example, a plastic, a rubber, a thermoplastic elastomer, including styrenic block copolymers, thermoplastic polyolefinelastomers, thermoplastic vulcanizates, thermoplastic polyurethanes, thermoplastic copolyester, thermoplastic polyamides, etc. As another example, the second material may be any suitable combination of the foregoing materials. The second material is more resilient than the first material. That is, the second material has a second resilience greater than the first resilience. For example, the second material may be more flexible or less rigid than the first material. Also, the second material has a lower durometer than the first material.

Figure 11:
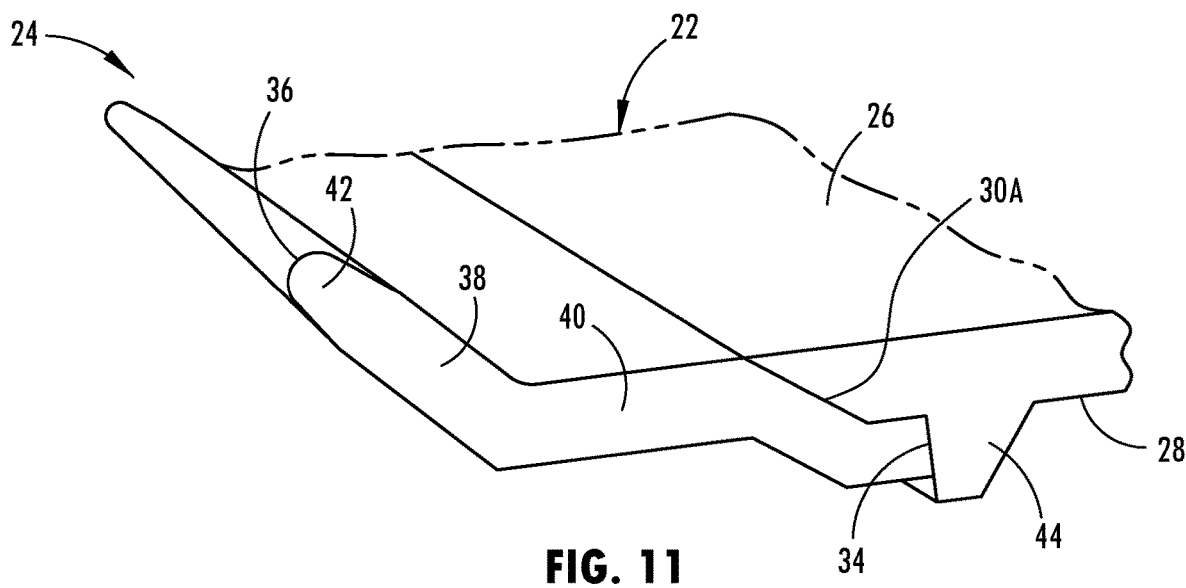
FIG. 11 is a schematic view of another example of a seal and door carrier.
Figure 12:
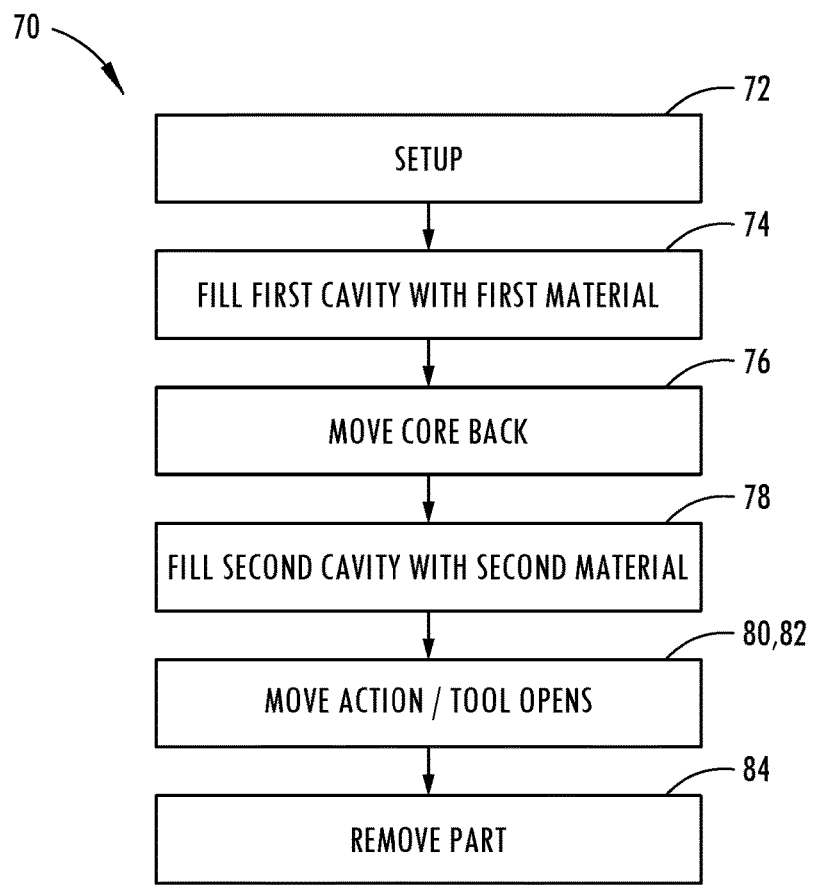
FIG. 12 is a process flow chart of a method for manufacturing the door carrier.
Figure 13:
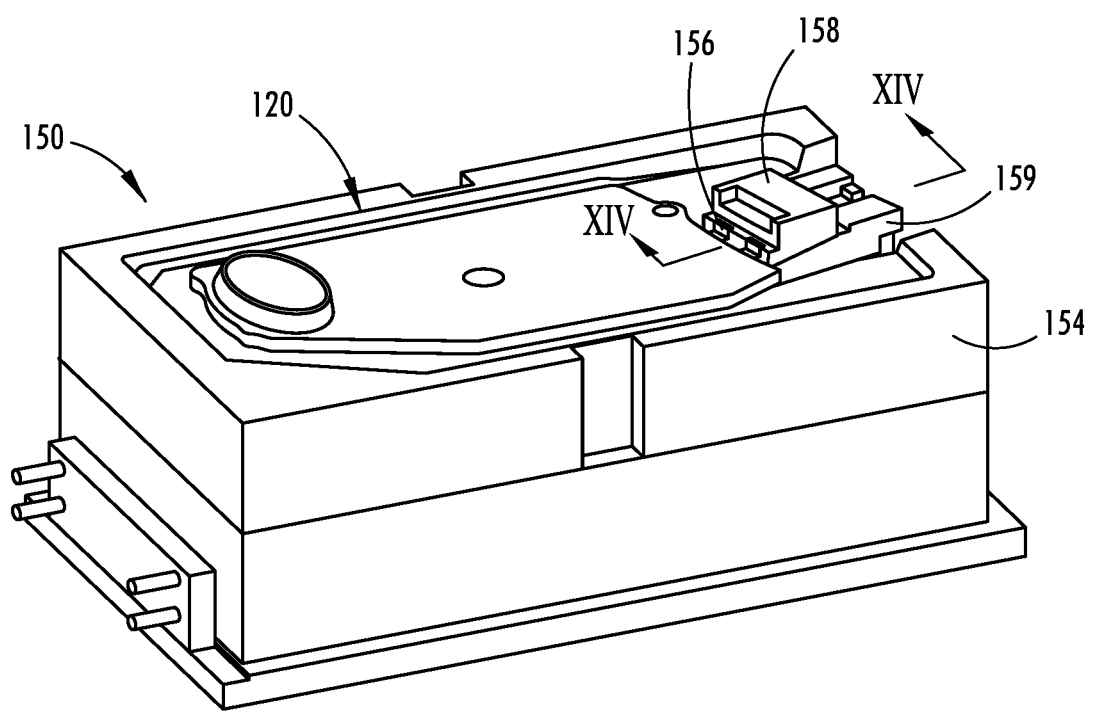
FIG. 13 is a perspective view of an additional injection molding assembly.

With reference to FIG. 4, in one embodiment, the body 22 may include a ledge 44 adjacent to the edge 30. The ledge 44 may extend continuously around the perimeter of the body 22. That is, the ledge 44 may completely surround the body 22 in a generally planar configuration. The seal 24 may be affixed to the ledge 44. For example, the ledge 44 may provide additional surface area for the seal 24, e.g., the proximal end 34, to be affixed to the body 22. For example, the ledge 44 may be flush with the edge 30. As another example, the ledge 44 may be offset from the edge 30, as shown in FIG. 11.

With reference to FIGS. 5-10, the door carrier 20 may be formed by an injection molding assembly 50. The injection molding assembly 50 may include a cover 52, a first tool 54, a core back 56, and a lifter 58. The injection molding assembly 50 may be formed of any suitable material, such as, for example, steel, stainless steel, iron, brass, etc.

The cover 52 may generally correspond to the first surface 26 of the body 22. The portion of the tool opposite the cover 52 or second part of the tool 54 may be spaced from and opposite the cover 52. The first tool 54 may generally correspond to the second surface 28 of the body 22. The core back 56 may be slidably attached to the first tool 54 along a first direction. That is, the core back 56 may slide back and forth along the first direction. The core back 56 may have a width approximately between 5 mm and 15 mm. The lifter 58 may be disposed between the cover 52 and the first tool 54. The cover 52, the first tool 54, and the lifter 58 may define a first cavity 60 therebetween. For example, the first cavity 60 may generally correspond to the body 22. When the core back 56 moves along the first direction away from the lifter 58, the body 22, the core back 56, and the lifter 58 may define a second cavity 62 therebetween. For example, the second cavity 62 may generally correspond to the seal 24.

In light of the foregoing, a method 70 for manufacturing the door carrier 20 will now be described with reference to FIGS. 5-10 and 12. The method 70 includes the step of setup 72, which includes properly locating and placing the components of the injection molding assembly 50 as described above. During setup 72, the cover 52, the first tool 54, and the lifter 58 are arranged such that they define the first cavity 60 generally corresponding to the body 22.

In step 74, the first cavity 60 is filled with the first material. The first cavity 60 may be filled by injection molding or any suitable process. For example, the first material may be heated until it melts, and then the melted first material may be injected into the first cavity 60 until the first cavity 60 is substantially filled. Then the melted first material may be cooled until the first material solidifies and forms a first piece, i.e., the body 22.

In step 76, the core back 56 may be slid relative to the first tool 54 along the first direction away from the lifter 58. At this point, the body 22, the core back 56, and the lifter 58 may define the second cavity 62 generally corresponding to the seal 24. The core back 56 may be moved along the first direction approximately between 0.5 mm and 3 mm, so as to generally correspond to the thickness of the seal 24.

In step 78, the second cavity 62 is filled with the second material. The second cavity 62 may be filled by injection molding or any suitable process. For example, the second material may be heated until it melts, and then the melted second material may be injected into the second cavity 62 until the second cavity 62 is substantially filled. Then the melted second material may be cooled until the second material solidifies and forms a second piece, i.e., the seal 24.

In step 80, the first tool 54 and the core back 56 are moved along the first direction away from the first piece, i.e., the body 22. The first tool 54 and the core back 56 may be moved simultaneously or separately from each other. In step 82, the lifter 58 is away from the first piece, i.e., the body 22. The lifter 58 is moved along a second direction generally perpendicular to the first direction. A portion of the lifter 58 may be disposed between the seal 24 and the rail 32 of the body 22. Because of the angle between the first portion 40 and the second portion 42 of the seal 24, the lifter 58 may slide along the seal 24, i.e., the second portion 42, as it moves along the second direction away from the body 22. The resilient nature of the seal 24 allows the seal 24 to flex as the lifter 58 slides along the seal 24. For example, prior to moving the lifter 58 along the second direction, i.e., between steps 80 and 82, the seal 24 is in a first position.

While moving the lifter along the second direction, i.e., during step 82, the seal 24 flexes away from the lifter 58 along the first direction to a second position. After moving the lifter along the second direction, i.e., after step 82, the seal 24 flexes and returns to the first position.

In step 84, the part, i.e., the door carrier 20, is removed from the injection molding assembly 50 and the door carrier may then be used in any suitable application. For example, the door carrier 20 may be installed in a vehicle.

Referring now to FIGS. 13-18, an additional door carrier 120 may be formed by an injection molding assembly 150. The injection molding assembly 150 may include a cover 152, a first tool 154, an accessory die piece 156, and a two-piece lifter 158, 159. The injection molding assembly 150 may be formed of any suitable material, such as, for example, steel, stainless steel, iron, brass, etc.

Figure 15:
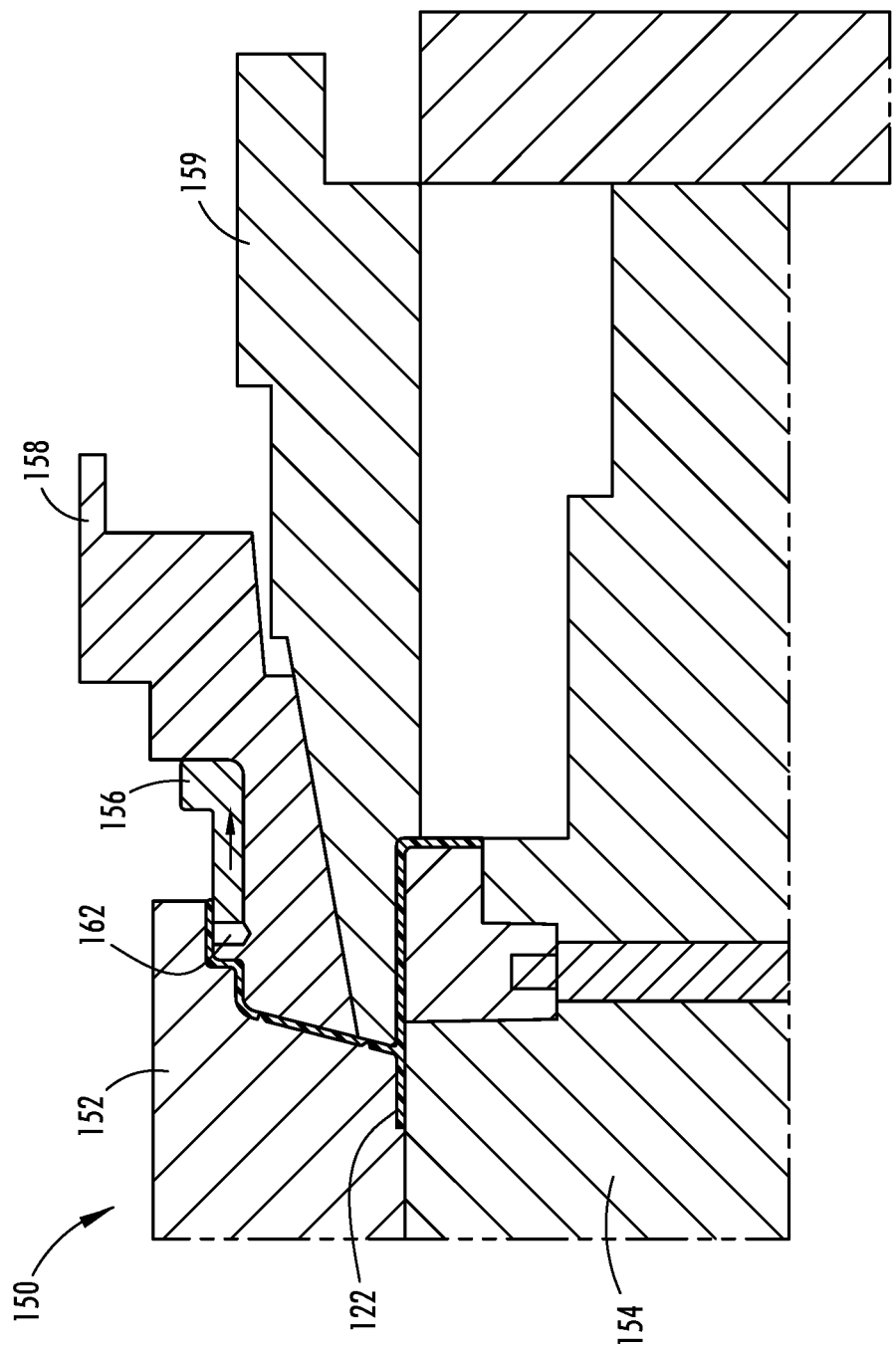
FIG. 15 is a schematic cross-sectional view of a movement stage of an accessory die piece of the injection molding assembly of FIG. 13.

The cover 152 may generally correspond to the first surface 126 of the body 122. The portion of the tool opposite the cover 152 or second part of the first tool 154 may be spaced from and opposite the cover 152. The first tool 154 may generally correspond to the second surface 128 of the body 122. The accessory die piece 156, which may also be referred to as a core back, may be slidably attached to the first tool 154 along a first direction. That is, the accessory die piece 156 may slide back and forth along the first direction. The accessory die piece 156 may have a width approximately between 5 mm and 15 mm. The lifter 158, 159 may be disposed between the cover 152 and the first tool 154. The cover 152, the first tool 154, and the lifter 158, 159 may define a first cavity therebetween for forming the body 122 of the door carrier 120. For example, the first cavity may generally correspond to the body 122. When the accessory die piece 156 moves along the first direction on and toward from the lifter 158, 159, the accessory die piece 156 and the upper lifter 158 may define a second cavity 162 therebetween, such as shown in FIG. 15. For example, the second cavity 162 may generally correspond to the seal 124.

Figure 14:
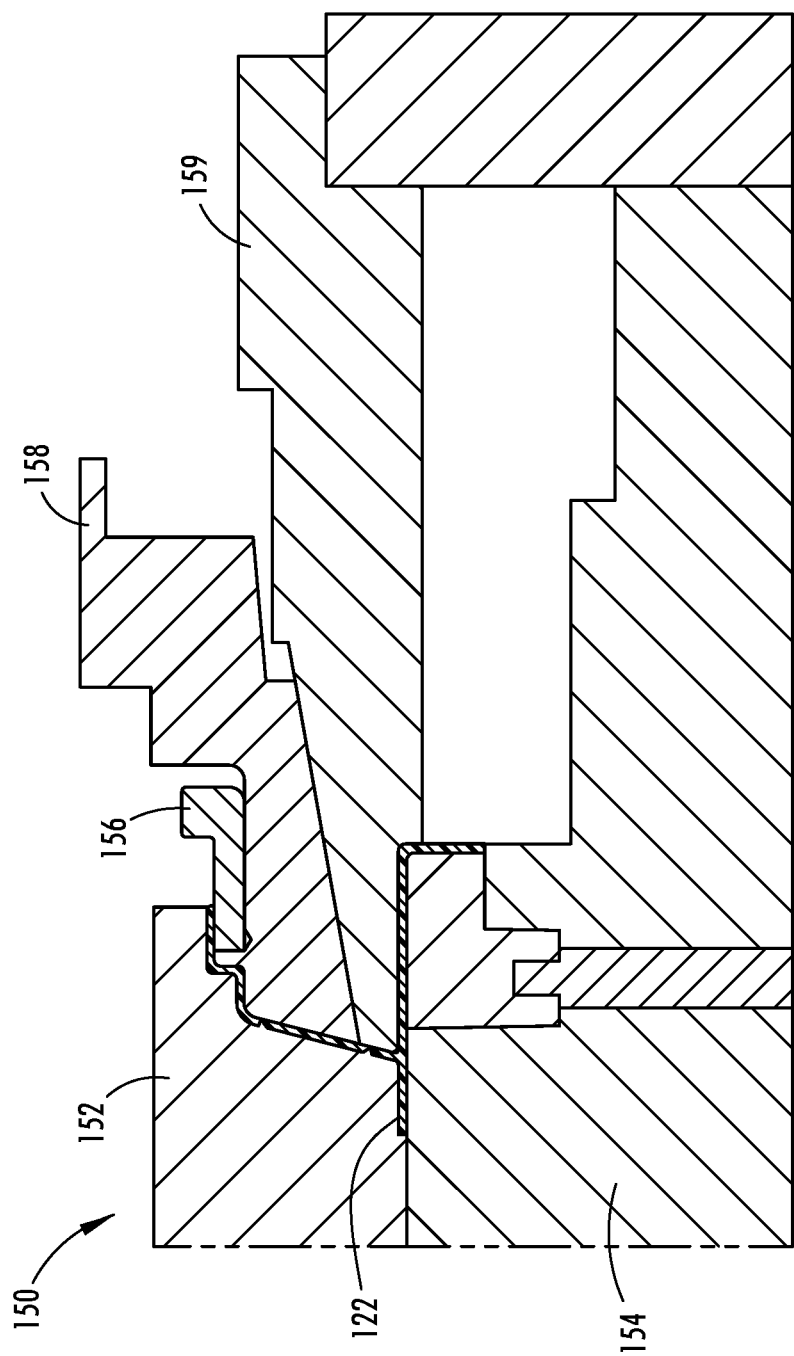
FIG. 14 is a schematic cross-sectional view of a first shot injection stage of the injection molding assembly, taken at line XIV-XIV of FIG. 13.

As shown in FIG. 14, after properly locating and placing the components of the injection molding assembly 150 as described above, the first cavity is filled with the first material. The first cavity may be filled by injection molding or any suitable process. For example, the first material may be heated until it melts, and then the melted first material may be injected into the first cavity until the first cavity is substantially filled. Then the melted first material may be cooled until the first material solidifies and forms a first piece, i.e., the body 122. As shown in FIG. 15, the accessory die piece 156 may be slid laterally along a first direction away from the cover 152 and over an upper surface of the upper lifter 158. At this point, the body 122, the accessory die piece 156, and the upper lifter 158 may define the second cavity 162 generally corresponding to the seal 124, such as shown in FIG. 15. The accessory die piece 156 may be moved along the first direction approximately between 0.5 mm and 5 mm, so as to generally correspond to the thickness of the seal 124.

Figure 16:
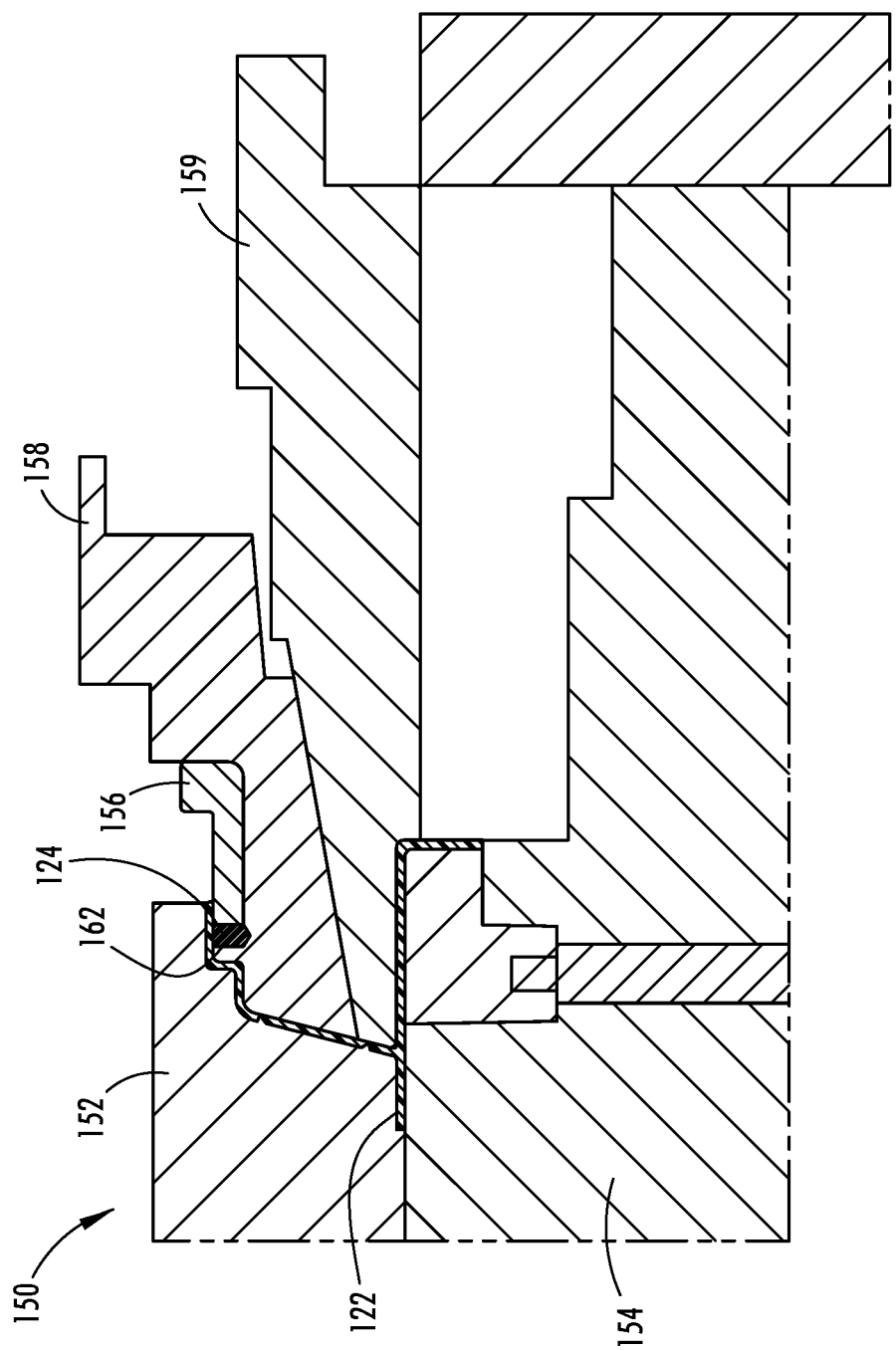
FIG. 16 is a schematic cross-sectional view of a second shot injection stage of the injection molding assembly of FIG. 13.
Figure 17:
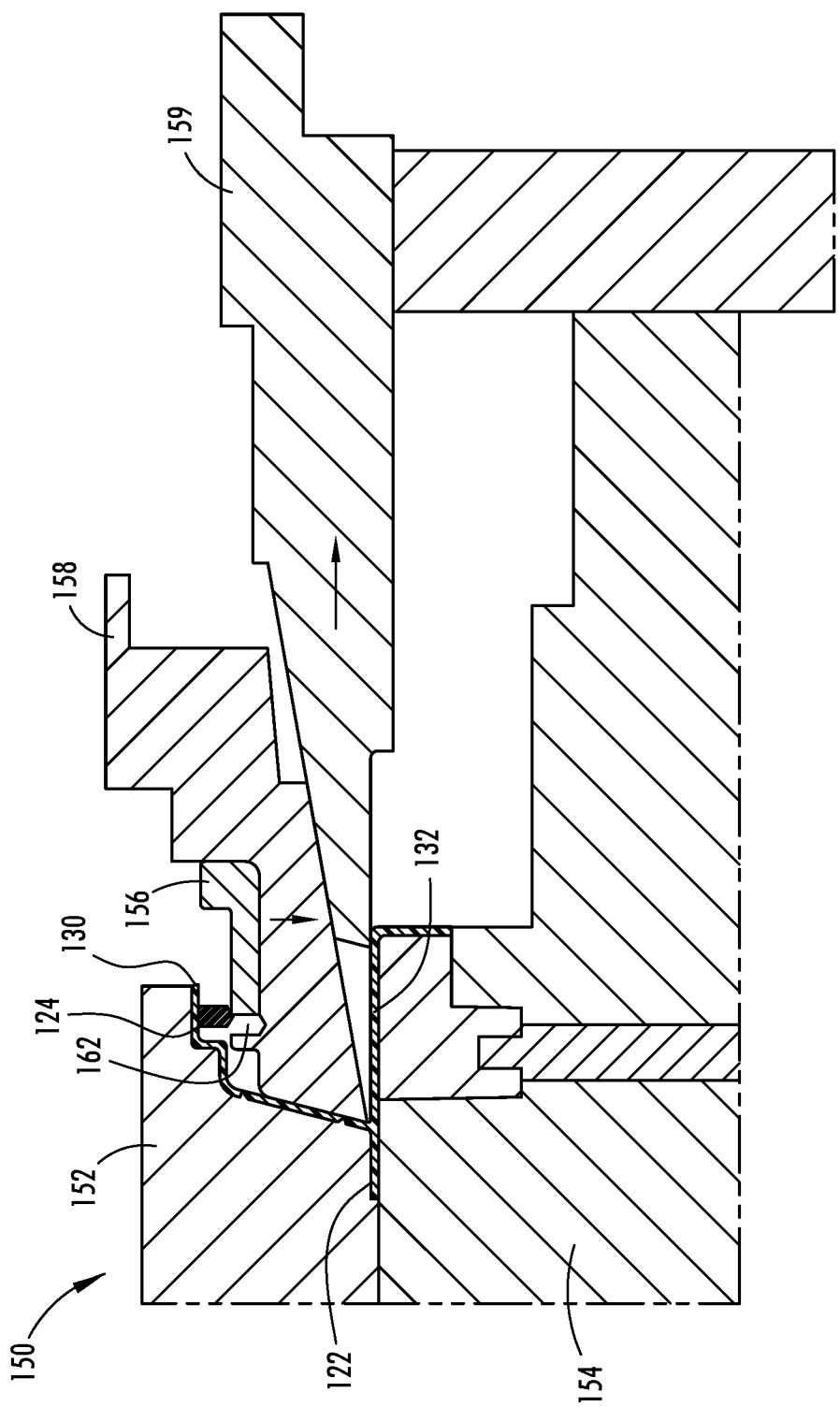
FIG. 17 is an initial stage release of a lowering die piece of the injection molding assembly of FIG. 13.

As shown in FIG. 16, the second cavity 162 is filled with the second material. The second cavity 162 may be filled by injection molding or any suitable process. For example, the second material may be heated until it melts, and then the melted second material may be injected into the second cavity 162 until the second cavity 162 is substantially filled. Then the melted second material may be cooled until the second material solidifies and forms a second piece, i.e., the seal 124. As shown in FIG. 17, the lower lifter 159 is wedge shaped and moves laterally outward a first distance to cause the upper lifter 158 to move downward a distance sufficient to remove the seal 124 from the cavity 162, i.e. the length of the seal 124. Thus, the upper lifter 158 lowers toward the integral window rail 132 that overlaps the edge 130 of the body 122.

Figure 18:
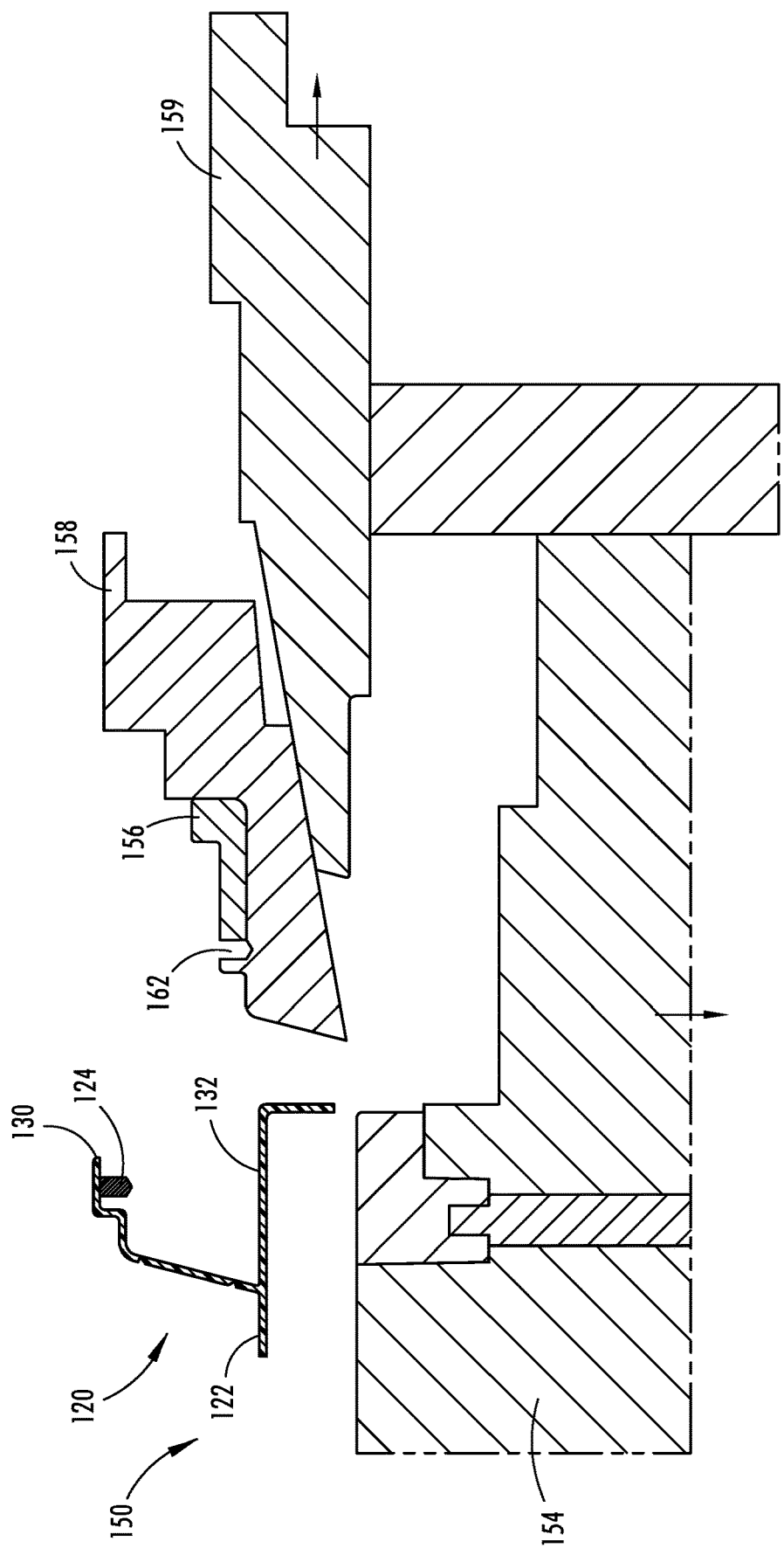
FIG. 18 is a secondary stage release of remaining die pieces of the injection molding assembly of FIG. 13.

As shown in FIG. 18, with the upper and lower lifters 158, 159 moved away from the seal, the cover 152, the first tool 154, and the combined lifter 158, 159 may be moved simultaneously or separately from each other. The part, i.e., the door carrier 120, is removed from the injection molding assembly 150 and the door carrier may then be used in any suitable application. For example, the door carrier 120 may be installed in a vehicle.

Referring now to FIGS. 19-22, an additional door carrier 220 may be formed by an injection molding assembly 250. The injection molding assembly 250 may include a cover 252, a first tool 254, and a core back 256. The injection molding assembly 250 may be formed of any suitable material, such as, for example, steel, stainless steel, iron, brass, etc.

Figure 20:
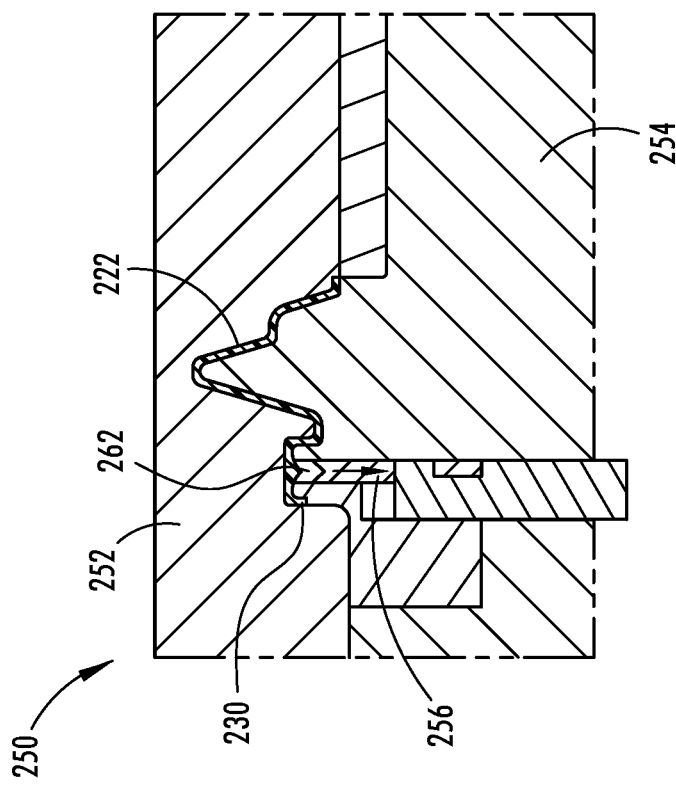
FIG. 20 is a schematic cross-sectional view of a core back removal stage of the injection molding assembly of FIG. 19.
Figure 22:
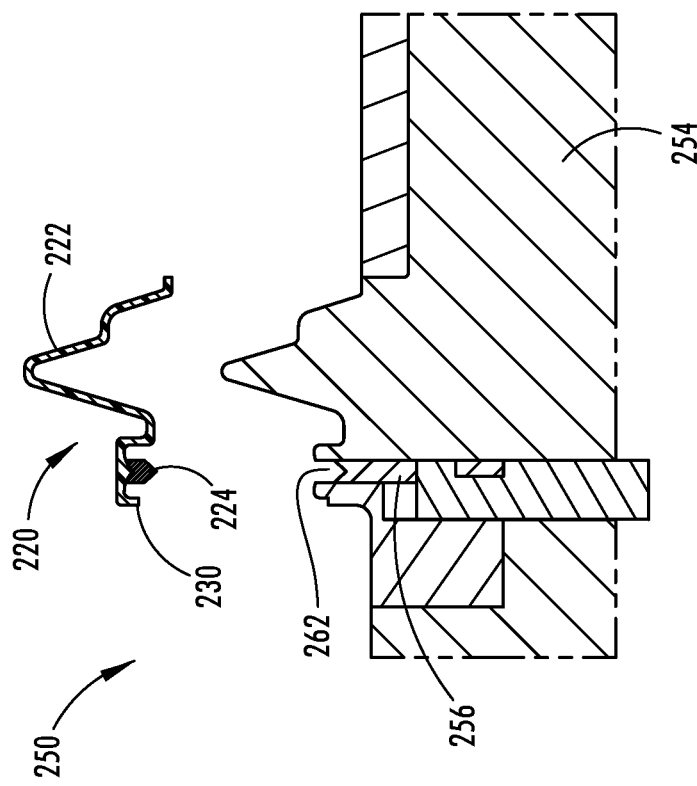
FIG. 22 is a release of die pieces of the injection molding assembly of FIG. 19.

The cover 252 may generally correspond to the first surface 226 of the body 222. The portion of the tool opposite the cover 252 or second part of the first tool 254 may be spaced from and opposite the cover 252. The first tool 254 may generally correspond to the second surface 228 of the body 222. The core back 256 may be slidably attached to the first tool 254 along a first direction (FIG. 20). That is, the core back 256 may slide back and forth along the first direction. The core back 256 may have a width approximately between 5 mm and 15 mm. The cover 252 and the first tool 254 may define a first cavity therebetween. For example, the first cavity may generally correspond to the body 222. When the core back 256 moves along the first direction away from the cover 252 and the body 222, the core back 256 and the first tool 254 may define a second cavity 262 therebetween, such as shown in FIG. 20. For example, the second cavity 262 may generally correspond to the seal 224, which may have chevron cross-sectional shape, as shown in FIG. 22.

Figure 19:
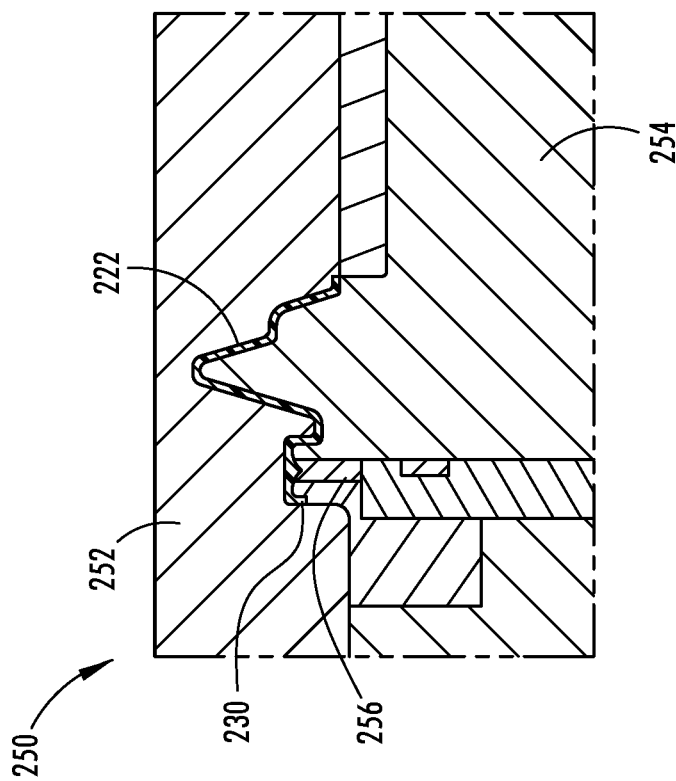
FIG. 19 is a schematic cross-sectional view of a first shot injection stage of an additional injection molding assembly.

As shown in FIG. 19, after properly locating and placing the components of the injection molding assembly 250 as described above, the first cavity is filled with the first material. The first cavity may be filled by injection molding or any suitable process. For example, the first material may be heated until it melts, and then the melted first material may be injected into the first cavity until the first cavity is substantially filled. Then the melted first material may be cooled until the first material solidifies and forms a first piece, i.e., the body 222. As shown in FIG. 20, the core back 256 may be slid relative to the first tool 254 along the first direction away from the cover 252. At this point, the body 222, the core back 256, and the first tool 254 may define the second cavity 262 generally corresponding to the seal 224. The core back 256 may be moved along the first direction approximately between 0.5 mm and 15 mm, so as to generally correspond to the length of the seal 224, where the width of the second cavity 262 may defines the thickness of the seal 224.

Figure 21:
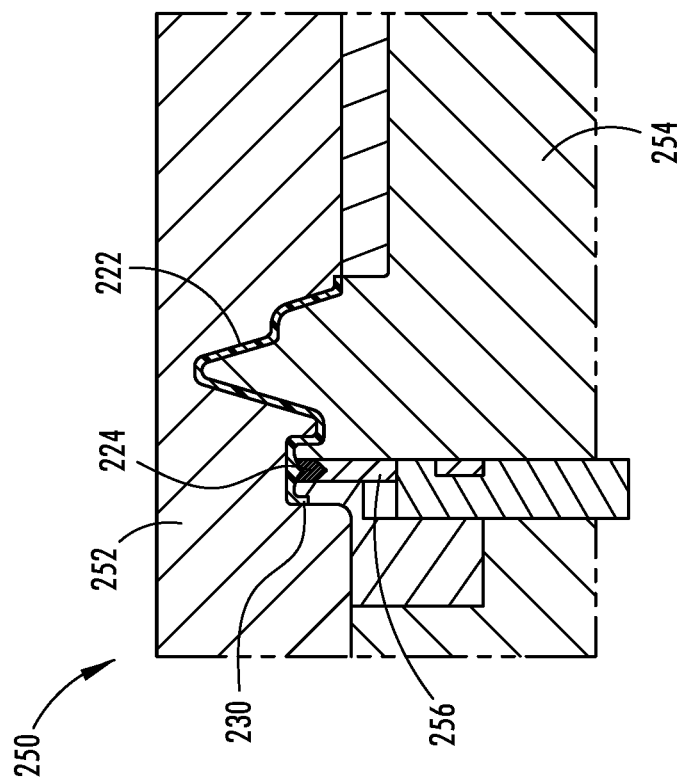
FIG. 21 is a schematic cross-sectional view of a second shot injection stage of the injection molding assembly of FIG. 19.

As shown in FIG. 21, the second cavity 262 is filled with the second material. The second cavity 262 may be filled by injection molding or any suitable process. For example, the second material may be heated until it melts, and then the melted second material may be injected into the second cavity 262 until the second cavity 262 is substantially filled. Then the melted second material may be cooled until the second material solidifies and forms a second piece, i.e., the seal 224. As shown in FIG. 22, the first tool 254 and the core back 256 are moved along the first direction away from the cover 252 and the first piece, i.e., the body 222. The first tool 254 and the core back 256 may be moved simultaneously or separately from each other. The part, i.e., the door carrier 220, is removed from the injection molding assembly 250 and the door carrier may then be used in any suitable application. For example, the door carrier 220 may be installed in a vehicle.

For purposes of this disclosure, the terms "upper," "lower," "right," "left," "rear," "front," "vertical," "horizontal," and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A door carrier comprising:
    a body formed of a first material, the body including an edge extending a perimeter of the body,
    wherein the body includes a first surface and a second surface opposite the first surface, the edge disposed between the first surface and the second surface, and
    wherein the body includes a window rail integrally formed with the first surface of the body and having an overhanging portion that extends beyond the edge of the body, and
    a seal having a proximal end affixed to the edge and a distal end configured to contact a door structure disposed between the edge of the body and the window rail, the seal being injection molded with the body and comprising a second material more resilient than the first material,
    wherein the seal includes a first portion extending from the proximal end and a second portion extending from the first portion to the distal end, and
    wherein the seal has a bend between the first portion and the second portion such that the first portion extends from the proximal end to the bend and the second portion extends from the bend to the distal end,
    wherein the first portion of the seal extends generally parallel to the window rail and the second portion of the seal extends from the bend generally towards the window rail.

2. The door carrier of claim 1, wherein the edge extends continuously along the perimeter of the body and the proximal end of the seal is affixed to the edge continuously along the perimeter of the body.

3. The door carrier of claim 1, wherein the bend of the seal extends continuously around the perimeter of the body.

4. The door carrier of claim 1, wherein the edge extends from the first surface to the second surface.

5. The door carrier of claim 1, wherein the first portion of the seal extends from the proximal end to the bend in a first direction and the second portion of the seal extends from the bend to the distal end in a second direction at an angle relative to the first direction.

6. The door carrier of claim 5, wherein the angle is greater than 90 and less than 180 degrees.

7. The door carrier of claim 1, wherein the seal is affixed to the edge by chemical bonding.

8. The door carrier of claim 1, wherein the seal has a length from the proximal end to the distal end, the length being between 5 mm and 15 mm.

9. The door carrier of claim 1, wherein the seal has a thickness between 0.5 mm and 3 mm.

10. The door carrier of claim 1, wherein the first material includes a polypropylene.

11. The door carrier of claim 1, wherein the second material includes a thermoplastic elastomer.

12. The door carrier of claim 1, wherein the first portion of the seal extends at an angle relative to the second portion of the seal.

13. A method for manufacturing a door carrier comprising:
    providing a cover;
    providing a tool spaced from and opposite the cover to define a first cavity therebetween;
    providing a core back slidably attached to the tool, the core back being slidable to open a second cavity adjacent to the first cavity;
    filling the first cavity with a first material to form a body that has a first surface, a second surface opposite the first surface, and a peripheral edge extending along a perimeter of the body and disposed between the first surface and the second surface, and wherein the body has a window rail integrally formed with the first surface of the body with an overhanging portion that extends beyond the peripheral edge of the body;
    moving the core back away from the body to open the second cavity adjacent to the peripheral edge of the body;
    filling the second cavity with a second material more resilient than the first material to form a seal having a proximal end affixed to the peripheral edge and a distal end configured to contact a door structure disposed between the edge of the body and the window rail, the seal has a first portion extending from the proximal end and a second portion extending from the first portion to the distal end, wherein the seal has a bend between the first portion and the second portion such that the first portion extends from the proximal end to the bend and the second portion extends from the bend to the distal end and toward the overhanging portion of the window rail, and wherein the first portion of the seal extends generally parallel to the window rail and the second portion of the seal extends from the bend generally towards the window rail; and
    moving the tool and the core back away from the body to release the body and the seal.

14. The method of claim 13, further comprising:
    providing a lifter between the cover and the tool, wherein the lifter further defines the first cavity and is moveable in a direction perpendicular to a direction the tool and the core back move to release the body and the seal.

15. The method of claim 14, wherein prior to moving the lifter, the seal is in a first position, wherein moving the lifter to release the body and the seal causes the seal to flex to a second position, and wherein after the moving the lifter, the seal returns to the first position.

16. The method of claim 13, wherein the first cavity and the second cavity are filled by injection molding.

17. The method of claim 13, wherein the second cavity has a height between 0.5 mm and 3 mm.

18. The method of claim 13, wherein the seal has a length between 5 mm and 15 mm.

19. The method of claim 13, wherein the seal is chemically bonded to the body.

20. The method of claim 13, wherein the first material includes a polypropylene.

21. The method of claim 13, wherein the second material includes a thermoplastic elastomer.

* * * * *

UNITED STATES PATENT AND TRADEMARK OFFICE
CERTIFICATE OF CORRECTION

| | | |
|---|---|---|
| PATENT NO. | : 11,511,610 B2 | Page 1 of 1 |
| APPLICATION NO. | : 16/681364 | |
| DATED | : November 29, 2022 | |
| INVENTOR(S) | : Dunn | |

It is certified that error appears in the above-identified patent and that said Letters Patent is hereby corrected as shown below:

In the Claims

In Column 9, Claim 1, Line 37, please change "a" to read --along a--

In Column 9, Claim 3, Line 67, please change "around" to read --along--

In Column 10, Claim 6, Line 9, please change "90" to read --90 degrees--

Signed and Sealed this
Twelfth Day of September, 2023

*Katherine Kelly Vidal*

Katherine Kelly Vidal
*Director of the United States Patent and Trademark Office*